Patented Oct. 20, 1942

2,299,132

UNITED STATES PATENT OFFICE 2,299,132

MANUFACTURE OF CELLULOSE

Henry Dreyfus, London, England, assignor to Celanese Corporation of America, a corporation of Delaware No Drawing. Application December 29, 1938, Serial No. 248,205. In Great Britain January 27, 1938

12 Claims. (Cl. 92—9)

This invention relates to the manufacture from wood and other lignin-containing cellulosic materials of cellulose of a relatively high degree of purity.

According to the present invention lignin-containing cellulosic materials are impregnated with dilute nitric acid under conditions such that the lignin is substantially unattacked, the nitric acid is concentrated in contact with the materials, and the materials containing the more concentrated acids are subjected to a temperature at which the nitric acid attacks the lignin contained therein. When the attack has proceeded sufficiently far the nitric acid may be removed from the materials, for example by washing, and the materials may then be treated with alkali.

In the preferred method of carrying out the invention the concentration of the nitric acid in the materials is carried out by evaporation at a temperature at which the acid does not attack the non-cellulosic constituents to any substantial degree. Preferably, the acid is concentrated by evaporating of water at a low temperature and under a pressure considerably lower than atmospheric. The evaporation of the water may be aided and expedited by passing a stream of warm or even of cool air or other gaseous medium, e. g. nitrogen or other non-oxidizing medium, under the required pressure over or through the materials. If desired a substance forming with water a constant boiling mixture of boiling point lower than 100° C., for example benzene, may be added to the dilute acid to assist in the removal of water.

The initial concentration of the nitric acid is preferably so chosen that while the amount of acid present is at least sufficient to attack all the non-cellulosic constituents of the materials the volume of the acid solution is amply sufficient for uniform impregnation of the materials. For example, the amount of the solution may with advantage be 4, 6, 8 or 10 times the air-dry weight of the materials. The amount of nitric acid may, for example, be 30% or less of the weight of the materials. It is an advantage of the present invention that by producing a substantially uniform distribution of the nitric acid throughout the materials it makes it possible to employ less acid than is usually necessary. For example, the materials may be impregnated with 5 times their weigh of a 5% nitric acid or with 8 times their weight of a 2½% nitric acid. If smaller amounts of acid are to be used it is preferable to employ a more dilute acid rather than to lower the amount of solution below about 2-4 times the weight of the materials. The amount of acid present in the solution should be somewhat greater than that theoretically required to react with the non-cellulosic constituents so as to cover possible losses during the concentrating operation.

Various means may be adopted to assist the thorough and uniform impregnation of the materials with the acid solution. For example, the materials may be subjected to a preliminary boil with water or with a dilute alkali or acid solution, for example a caustic soda solution of concentration between 1 and 5%. Such preliminary treatments may, if desired, remove a certain proportion of the non-cellulosic constituents, and it is especially advantageous to remove resinous matters from the materials before they are subjected to the nitric acid treatment. Another means for facilitating the impregnation of the wood is a preliminary replacement of the air in the materials by steam, which on condensation creates a partial vacuum within the materials by means of which the acid solution is rapidly drawn into the pores and cells of the materials. Another method is to heat the materials with water under a considerable pressure, for example to a temperature of about 140°–160° C., and then suddenly to release the pressure, thus causing disruption of the materials. If desired the vessel in which the materials are may be evacuated before the acid solution is run in or the acid solution may be forced into the materials by pressures higher than atmospheric. Any two or more of these expedients may be adopted if desired.

Especially when the expedients outlined in the last paragraph have not been adopted it is of advantage to leave the materials immersed in the dilute acid solution for a considerable time, for example for 8 or 10 hours or more. Preferably the materials are kept at about room temperature, or at a temperature not greatly different from room temperature.

The concentration of the acid in the materials is preferably effected so as to produce an acid of concentration at least 10% and preferably higher than this, for example 15%, 20%, 25%, 30% or even higher. For example the materials may be heated to a temperature between 40° and 55° C. in a stream of air or nitrogen under a pressure between about 40 and 100 mms. The air or nitrogen may be heated to a somewhat higher temperature, e. g. 60° or 70° C. or more. The time taken for the acid to reach the desired concentration may be determined in any suitable way, for example by measuring the amount of water driven off in a test experiment. After the evaporation the temperature may be raised to the degree at which the nitric acid is capable of attacking the lignin and the materials impregnated with the acid allowed to stand, preferably for a number of hours, at this temperature. On the other hand the evaporation may be conducted at a temperature at which acid of the desired final concentration attacks the lignin but more dilute acid does not to any substantial degree; or the temperature may rise gradually during the evaporation, the final temperature and concentration attained being such that the lignin is attacked. Generally speaking, acids of concentration between 15 and 30% may be used at temperatures between about 40° or 45° and 60° C. to effect the attack on the lignin.

Following the treatment with the nitric acid the materials are preferably washed substantially free from acid, for example in warm or cold water or a warm or cold aqueous solution of a base or alkali, e. g. a dilute caustic soda solution. The materials may then be subjected to treatment with alkali in order to remove the products made by reaction of the lignin and other non-cellulosic constituents with the nitric acid. For example the materials may be treated with cold, moderately strong alkali, e. g. with a caustic soda of 7–20% concentration, at a temperature between about 10° and 25° C., and/or they may be treated in a warm or hot or boiling solution of an alkali of lower concentration and especially of concentration about 5% or less, for instance between 1½ and 3½%. The treatment with such dilute alkali may be moderately vigorous, for example it may be carried out at the boiling point of the alkali solution at atmospheric pressure or may be carried out under a higher pressure, either at the boil or below the boil, for example at temperatures between 100° and 130° C. If desired such dilute alkali may be employed under a pressure in excess of the vapour pressure of the solution at the temperature obtaining and such excess pressure may, for example, be produced by compressed nitrogen or other gas having no deleterious effect on the materials. Thus a pressure of 6–10 atmospheres in excess of the vapour pressure of the alkali solution may be employed at temperatures of 100°–130° C.

The materials resulting from the treatment with nitric acid may with advantage be subjected to a two-fold treatment with alkali, preferably first with dilute alkali at elevated or moderately elevated temperatures and under atmospheric pressure or super-atmospheric pressure, and then with cold more concentrated alkali, for example caustic alkali of concentration between 7 and 20%, especially between 8 and 15%.

The treatments described above are particularly suitable for obtaining cellulose from woods of various kinds. When part of the lignin is removed by a preliminary alkali treatment or by any other preliminary treatment the material remaining may be subjected to less vigorous conditions during the second part of the acid treatment, and/or during the subsequent alkali treatment or treatments. For example the acid or alkali concentration may be reduced, lower temperatures may be employed and/or the treatment may be continued for a shorter time.

The lignin-containing cellulosic material to be treated is preferably in a relatively finely divided form. For example wood may be employed in the form of chips, preferably small chips, or even of saw-dust or mechanical wood pulp.

The cellulose prepared by the present process may be utilised for any desired purpose, for example for the manufacture of cellulose derivatives or for the manufacture of paper or other products comprising fibrous cellulose. It may be subjected to any desired treatments such as, for example, a chlorine or hypochlorite bleach or other bleaching treatment.

For the manufacture of organic esters of cellulose with the aid of organic acid anhydrides the cellulose, after the alkali treatment which follows the acid treatment, is preferably subjected to a further treatment with an acid and particularly with a lower fatty acid, e. g. formic acid or acetic acid. Such acid may be applied in small or large quantities and in liquid or vapour form. Similarly, treatments with mineral acids, for example hydrochloric acid, sulphuric acid or nitric acid, may be applied, preferably in conjunction with acetic acid or other lower fatty acid. Such treatments are preferably carried out under conditions of temperature, concentration and quantity of mineral acid which do not lead to substantial degradation of the cellulose. A treatment with a lower fatty acid, for example acetic acid, may be applied in such a way as to introduce into the cellulose the catalyst required for the subsequent acetylation or other esterification. If desired any mineral acid used during the pretreatment may be neutralised or substantially neutralised before applying the esterifying agent. Further details regarding the pretreatment are contained in French Specification No. 565,654 and U. S. Patents Nos. 1,831,101 and 1,911,069.

For the manufacture of good quality cellulose ethers and for the manufacture of viscose and other cellulose derivatives in which alkali is present during the conversion into the cellulose derivative, pretreatments with mineral and/or organic acids are in general unnecessary and the cellulose, if desired after bleaching, may be subjected directly to the treatment for conversion into the desired cellulose derivatives. Similarly in making nitrocellulose the nitrating acid may be applied directly to the cellulose, bleached or unbleached, prepared in accordance with the present invention.

Cellulose esters and ethers made from cellulose produced as above described may be employed in the manufacture of articles such as filaments and yarns of artificial silk and films, foils, moulded articles, etc., as also in compositions such as lacquer and other coating compositions and moulding powders.

The following example illustrates without in any way limiting the invention.

*Example*

Spruce chips are boiled in a digester for 1 hour with a 2% caustic soda solution, and are then thoroughly washed with hot water. They are then, still in the digester, immersed at room temperature in eight times their weight (calculated on the air-dry weight of the wood) of 2½% nitric acid, and allowed to stand. The amount of wood and nitric acid solution is such that not much more than half the digester is filled with the liquid. At the end of about eight hours the temperature of the acid is raised to 35°–40° C. and the pressure in the upper part of the digester is reduced until water is being rapidly evaporated from the dilute acid. A stream of air heated to about 60° C. is now blown under the reduced pressure through the digester until the acid remaining has a concentration of about 20%. The air stream is then stopped, and after the pressure in the digester has been restored to atmospheric the temperature is raised to about 50° C., and the wood, impregnated with the 20% acid, allowed to stand at this temperature for a few hours.

The contents of the digester are then washed rapidly two or three times with hot water, after which they are boiled under about 8 atmospheres pressure with a 4% caustic soda solution (i. e. a solution whose initial concentration is 4%; it will be somewhat diluted by the water retained on the materials, as well as by traces of nitric acid which have not been removed). The product is again washed, and allowed to stand two or three hours in 10% caustic soda solution at room temperature. After further washing, the product is a cellulose of a relatively high degree of purity. If desired a still purer product can be obtained by bleaching, first with chlorine water and then with an alkaline solution of a hypochlorite.

If desired the initial boil with alkali can be omitted or replaced by a boil with water. Especially when there is no preliminary treatment, the soaking in weak nitric acid can with advantage be extended to 10 hours or even longer.

Having described my invention, what I desire to secure by Letters Patent is:

1. Process for the manufacture of cellulose, which comprises impregnating lignin-containing cellulosic materials with nitric acid of substantially less than 10% concentration under conditions such that the lignin is substantially unattacked, concentrating to at least 10% strength the acid in contact with the materials, subjecting the materials containing the more concentrated acid to a temperature at which the nitric acid attacks the lignin contained therein, and removing the lignin reaction products by treatment with an alkali.

2. Process for the manufacture of cellulose, which comprises impregnating wood with nitric acid of substantially less than 10% concentration under conditions such that the lignin is substantially unattacked, concentrating to at least 10% strength the acid by evaporation while it is in contact with the wood, subjecting the wood containing the more concentrated acid to a temperature at which the nitric acid attacks the lignin contained therein, and removing the lignin reaction products by treatment with an alkali.

3. Process for the manufacture of cellulose, which comprises impregnating lignin-containing cellulosic materials at room temperature with at least twice the air-dry weight of the materials of nitric acid of substantially less than 10% concentration, concentrating to at least 10% strength the acid in contact with the materials while avoiding any substantial attack upon the materials, subjecting the materials containing the more concentrated acid to a temperature at which the nitric acid attacks the lignin contained therein, and removing the lignin reaction products by treatment with an alkali.

4. Process for the manufacture of cellulose, which comprises impregnating wood at about room temperature with at least four times the air-dry weight of the wood of nitric acid of substantially less than 10% concentration, concentrating to at least 10% strength the acid by evaporation while it is in contact with the wood while avoiding any substantial attack upon the wood, subjecting the wood containing the more concentrated acid to a temperature at which the nitric acid attacks the lignin contained therein, and removing the lignin reaction products by treatment with an alkali.

5. Process for the manufacture of cellulose, which comprises impregnating wood with nitric acid of substantially less than 10% concentration under conditions such that the lignin is substantially unattacked, evaporating water from the acid under a pressure between about 40 and 100 mm. at a temperature such that the lignin remains substantially unattacked during at least the greater part of the evaporation, continuing said evaporation until the acid concentration is above 10%, subjecting the wood containing the acid so concentrated to a temperature at which the nitric acid attacks the lignin contained therein, and removing the lignin reaction products by treatment with an alkali.

6. Process for the manufacture of cellulose, which comprises impregnating wood at about room temperature with at least four times its air-dry weight of nitric acid of substantially less than 10% concentration, evaporating water from the acid under a pressure between about 40 and 100 mm. at a temperature such that the lignin remains substantially unattacked during at least the greater part of the evaporation, continuing said evaporation until the acid concentration is above 10%, subjecting the wood containing the acid so concentrated to a temperature at which the nitric acid attacks the lignin contained therein, and removing the lignin reaction products by treatment with an alkali.

7. Process for the manufacture of cellulose, which comprises impregnating wood at about room temperature with at least four times its air-dry weight of nitric acid of substantially less than 10% concentration, concentrating the acid by evaporation while it is in contact with the wood to a concentration of 15 to 30%, while avoiding any substantial attack upon the wood, subjecting the wood containing the said concentrated acid to a temperature between 40 and 60° C., and removing the lignin reaction products by treatment with an alkali.

8. Process for the manufacture of cellulose, which comprises impregnating wood at about room temperature with at least four times its air-dry weight of nitric acid of substantially less than 10% concentration, evaporating water from the acid under a pressure between about 40 and 100 mm., at a temperature such that the lignin remains substantially unattacked during at least the greater part of the evaporation, until the acid reaches a concentration of 15 to 30%, subjecting the wood containing the said concentrated acid to a temperature between 40 and 60° C., and removing the lignin reaction products by treatment with an alkali.

9. Process for the manufacture of cellulose, which comprises impregnating wood with nitric acid of substantially less than 10% concentration under conditions such that the lignin is substantially unattacked, concentrating the acid to above 10% concentration by evaporation while it is in contact with the wood while avoiding any substantial attack upon the wood, thereafter subjecting the wood containing the more concentrated acid to a temperature at which the nitric acid attacks the lignin contained therein, freeing the materials from nitric acid, boiling them with a dilute alkali, and then treating them in the cold with a more concentrated alkali.

10. Process for the manufacture of cellulose, which comprises treating wood to expel substantially all the air therefrom, impregnating the wood with nitric acid of substantially less than 10% concentration under conditions such that the lignin is substantially unattacked, concentrating the acid to above 10% concentration by evaporation while it is in contact with the wood while avoiding any substantial attack upon the wood, subjecting the wood containing the more concentrated acid to a temperature at which the nitric acid attacks the lignin contained therein, and removing the lignin reaction products by treatment with an alkali.

11. Process for the manufacture of cellulose, which comprises treating wood to expel substantially all the air therefrom, impregnating the wood at about room temperature with at least 4 times its air-dry weight of nitric acid of substantially less than 10% concentration, evaporating water from the acid under a pressure between about 40 and 100 mm. at a temperature such that the lignin remains substantially unattacked during at least the greater part of the concentration, continuing said evaporation until the acid concentration is above 10% subjecting the wood containing the more concentrated acid to a temperature at which the nitric acid attacks the lignin contained therein, freeing the wood from nitric acid, boiling it with a dilute alkali and then treating it in the cold with a more concentrated alkali.

12. Process for the manufacture of cellulose, which comprises subjecting wood to a treatment whereby substantially all the air is expelled therefrom, impregnating the wood at about room temperature with at least four times its air-dry weight of nitric acid of substantially less than 10% concentration, removing water by evaporation from the acid under a pressure between about 40 and 100 mm. at a temperature such that the lignin remains substantially unattacked during at least the greater part of the evaporation until the concentration of the acid is between 15 and 30%, continuing said evaporation until the acid concentration is above 10% subjecting the wood containing the said concentrated acid to a temperature between 40 and 60° C., freeing the wood from nitric acid, boiling it with a dilute alkali and then treating it in the cold with a more concentrated alkali.

HENRY DREYFUS.

CERTIFICATE OF CORRECTION.

Patent No. 2,299,132.                                                October 20, 1942.

HENRY DREYFUS.

It is hereby certified that error appears in the printed specification of the above numbered patent requiring correction as follows: In the grant line 1, name of inventor, for "HARRY DREYFUS" read --HENRY DREYFUS--; page 1, first column, line 23, for the words "of water" read --off water--; line 51, for "weigh" read --weight--; and that the said Letters Patent should be read with this correction therein that the same may conform to the record of the case in the Patent Office.

Signed and sealed this 24th day of November, A. D. 1942.

(Seal)

Henry Van Arsdale,
Acting Commissioner of Patents.